Jan. 11, 1927.

D. F. LEPLEY 1,614,373

SKIP LOADING APPARATUS

Filed Oct. 29, 1924     7 Sheets-Sheet 1

D.F.Lepley
Inventor

By C.A.Snow&Co.
Attorneys

Jan. 11, 1927. 1,614,373
D. F. LEPLEY
SKIP LOADING APPARATUS
Filed Oct. 29, 1924 7 Sheets-Sheet 2
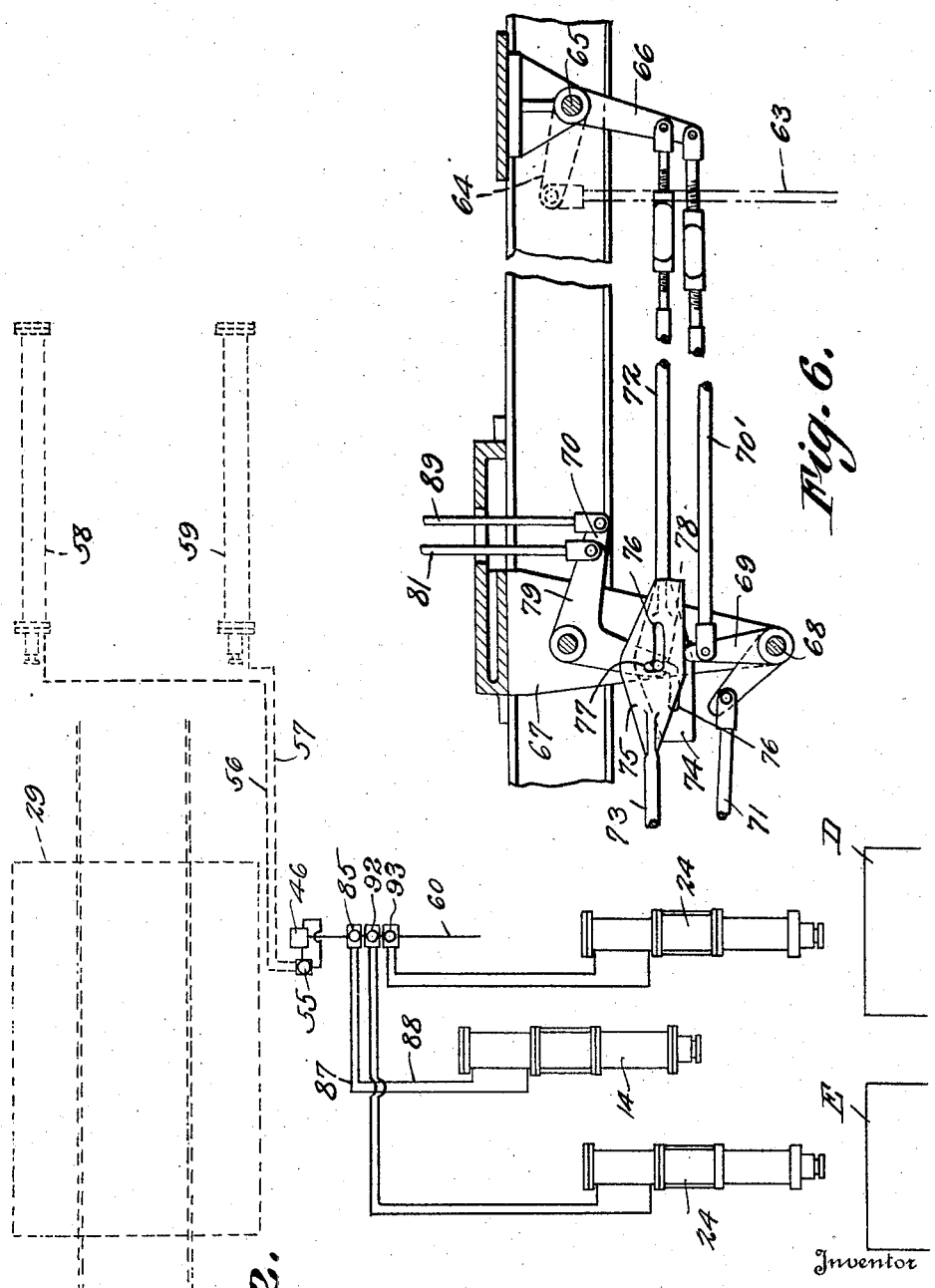

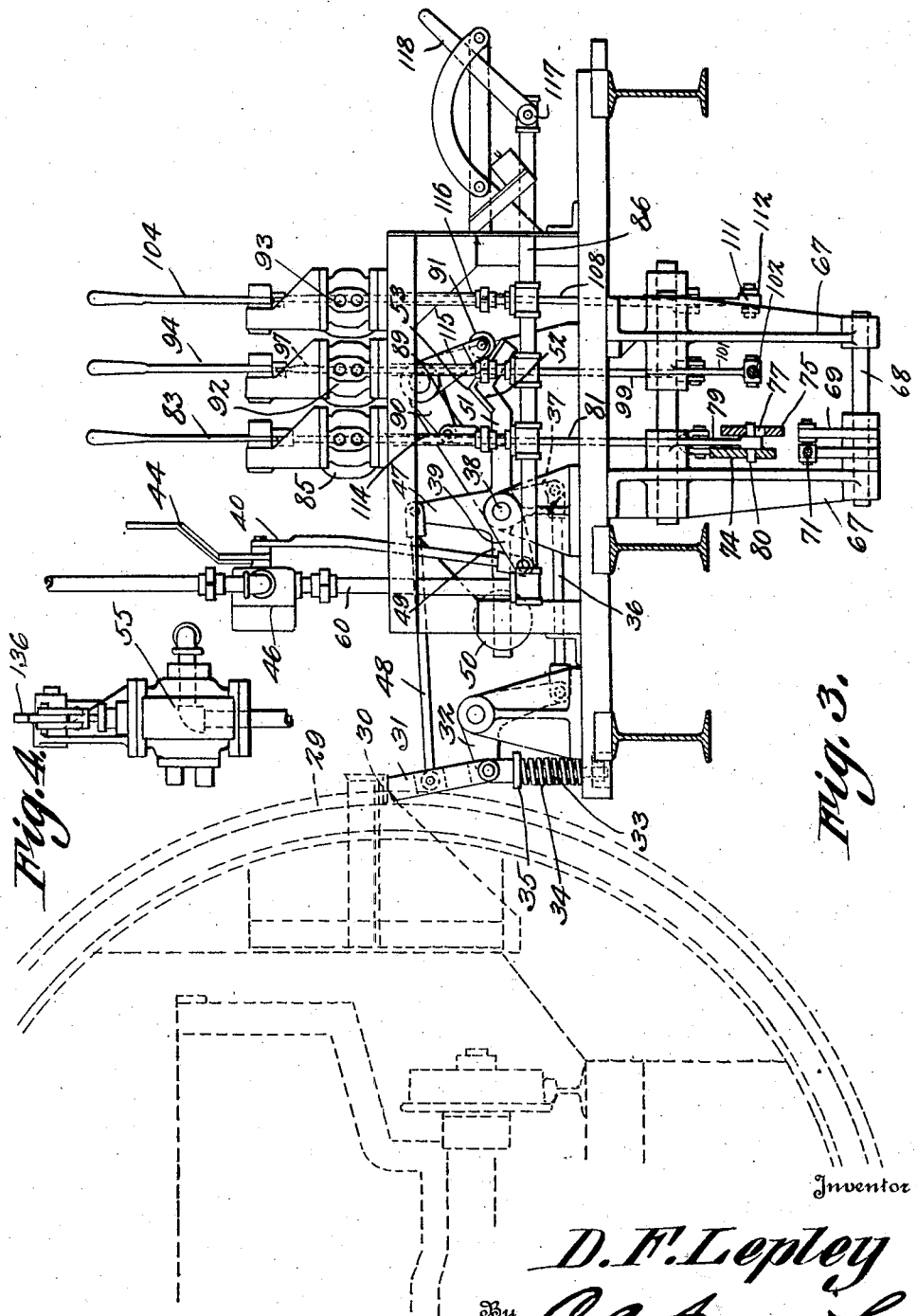

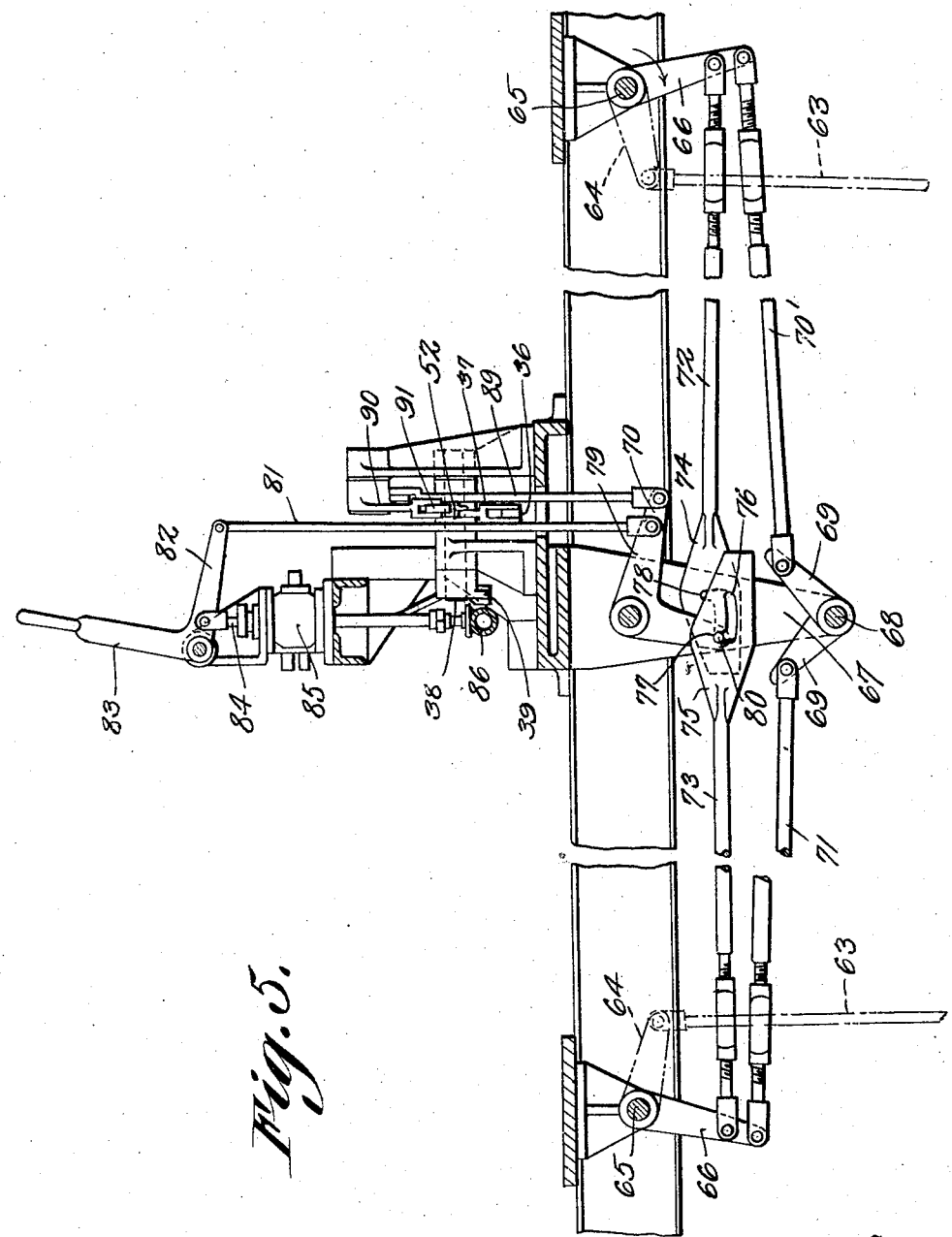

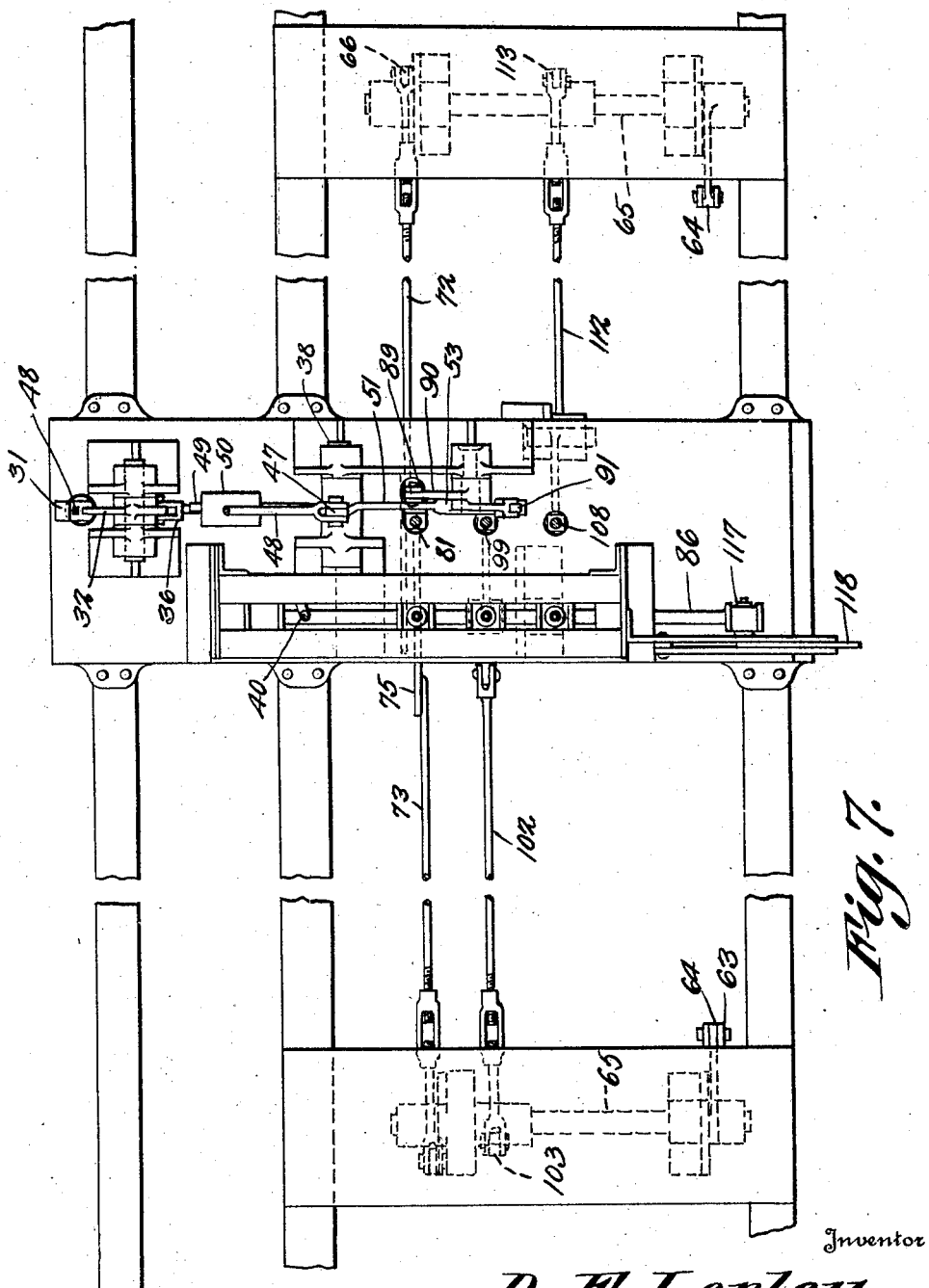

Jan. 11, 1927.  
D. F. LEPLEY  
SKIP LOADING APPARATUS  
Filed Oct. 29, 1924 7 Sheets-Sheet 6
1,614,373
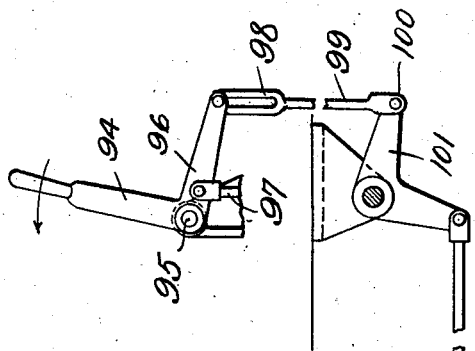
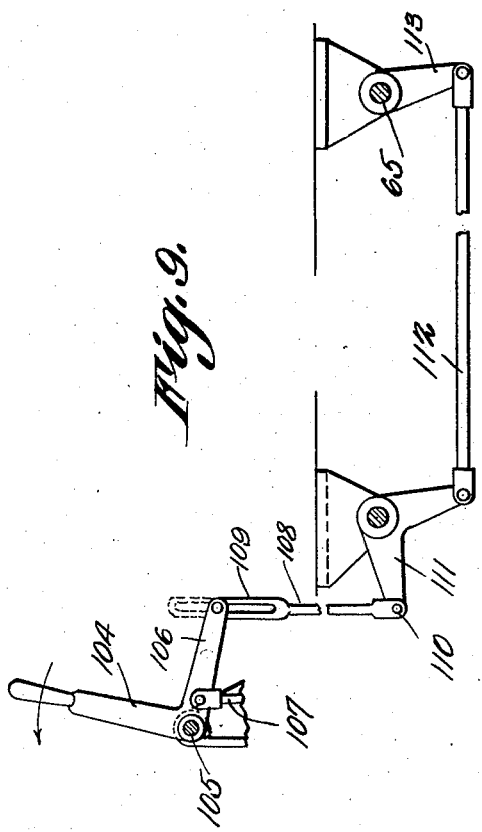
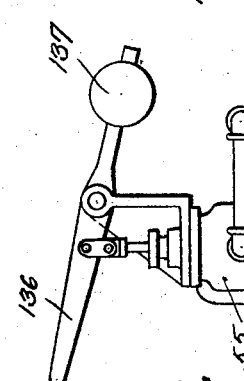
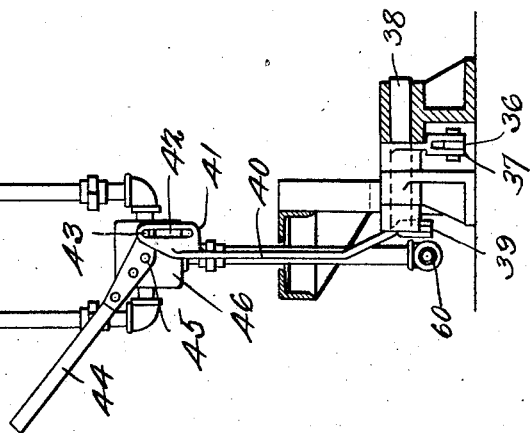
D. F. Lepley
Inventor
By C. A. Snow & Co.
Attorneys Jan. 11, 1927.
D. F. LEPLEY
1,614,373
SKIP LOADING APPARATUS
Filed Oct. 29, 1924    7 Sheets-Sheet 7
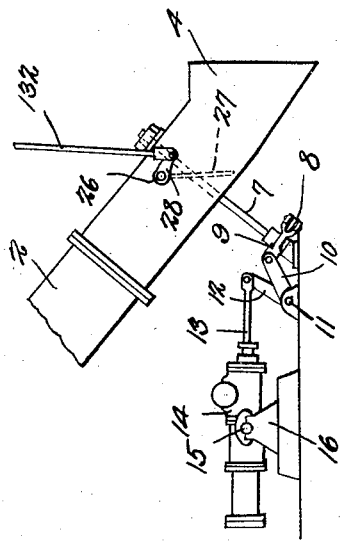
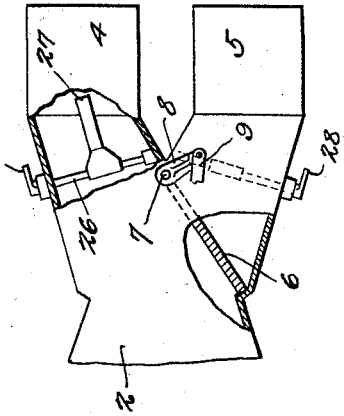
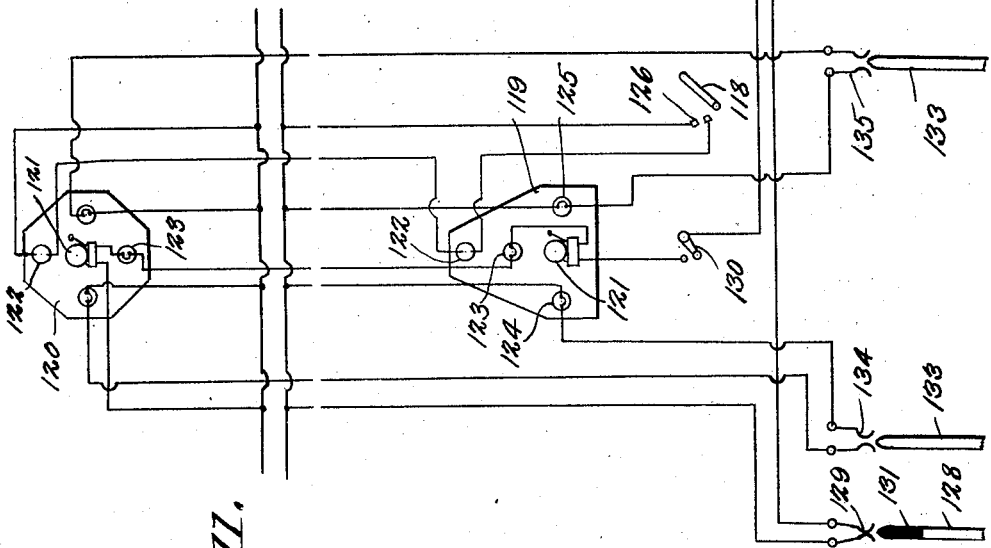
Inventor
D. F. Lepley
By C. A. Snow & Co.
Attorneys Patented Jan. 11, 1927.

1,614,373

UNITED STATES PATENT OFFICE.

DANIEL F. LEPLEY, OF CONNELLSVILLE, PENNSYLVANIA; PAUL V. LEPLEY, EXECUTOR OF SAID DANIEL F. LEPLEY, DECEASED, ASSIGNOR TO CONNELLSVILLE MANUFACTURING AND MINE SUPPLY CO., OF CONNELLSVILLE, PENNSYLVANIA, A CORPORATION.

SKIP-LOADING APPARATUS.

Application filed October 29, 1924. Serial No. 746,615.

This invention relates to a skip loading apparatus designed primarily for use in mines where coal, ore or other bulk material is to be loaded alternately into a pair of balanced skips.

One of the objects of the invention is to provide a mechanism whereby bulk material dumped into a chute will be directed automatically into one skip and then into the other in properly timed relation.

Another object is to provide a chute into which bulk material is to be deliverd, this chute having a means whereby the material directed thereinto will be automatically diverted to either of two loading pockets.

Another object is to provide means controlled by the skips for automatically releasing the load retained in the pocket to be emptied, there being an automatic unlocking system for safe-guarding against improper moves of the various parts of the mechanism and to insure operation of the parts in proper sequence.

A still further object is to provide a means for indicating at remote points the position of the load in the chute pockets.

Another object is to provide novel and efficient valve mechanism for controlling the operating means of the apparatus.

A still further object is to provide a signaling system under the control of the chute pockets.

A further object is to provide a signal mechanism under the control of the bulk material in the chute pockets.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Fig. 2 is a view in diagram showing the engines, pipe lines and valves of the apparatus.

Fig. 3 is an elevation of the controlling valve mechanism and adjacent parts, the auxiliary dump valve being removed therefrom.

Fig. 4 is an elevation of the auxiliary dump valve.

Fig. 5 is a view partly in section and partly in elevation of the mechanism operating the fly gate valve and dump valve.

Fig. 6 is a similar view of a portion of the mechanism showing the same in another position.

Fig. 7 is a plan view of a portion of the mechanism, the upwardly extending connecting rods being in section.

Fig. 8 is a view partly in side elevation and partly in section of a portion of the interlocking valve mechanism.

Fig. 9 is a view partly in section and partly in elevation of another portion of the interlocking valve mechanism.

Fig. 10 is a view similar to Fig. 9 showing another portion of the interlocking valve mechanism.

Fig. 11 is a view in diagram showing the signal mechanism.

Fig. 12 is a side elevation of a portion of the chute mechanism.

Fig. 13 is a view partly in plan and partly in section of a portion of the chute and the parts connected thereto.

Figure 1:
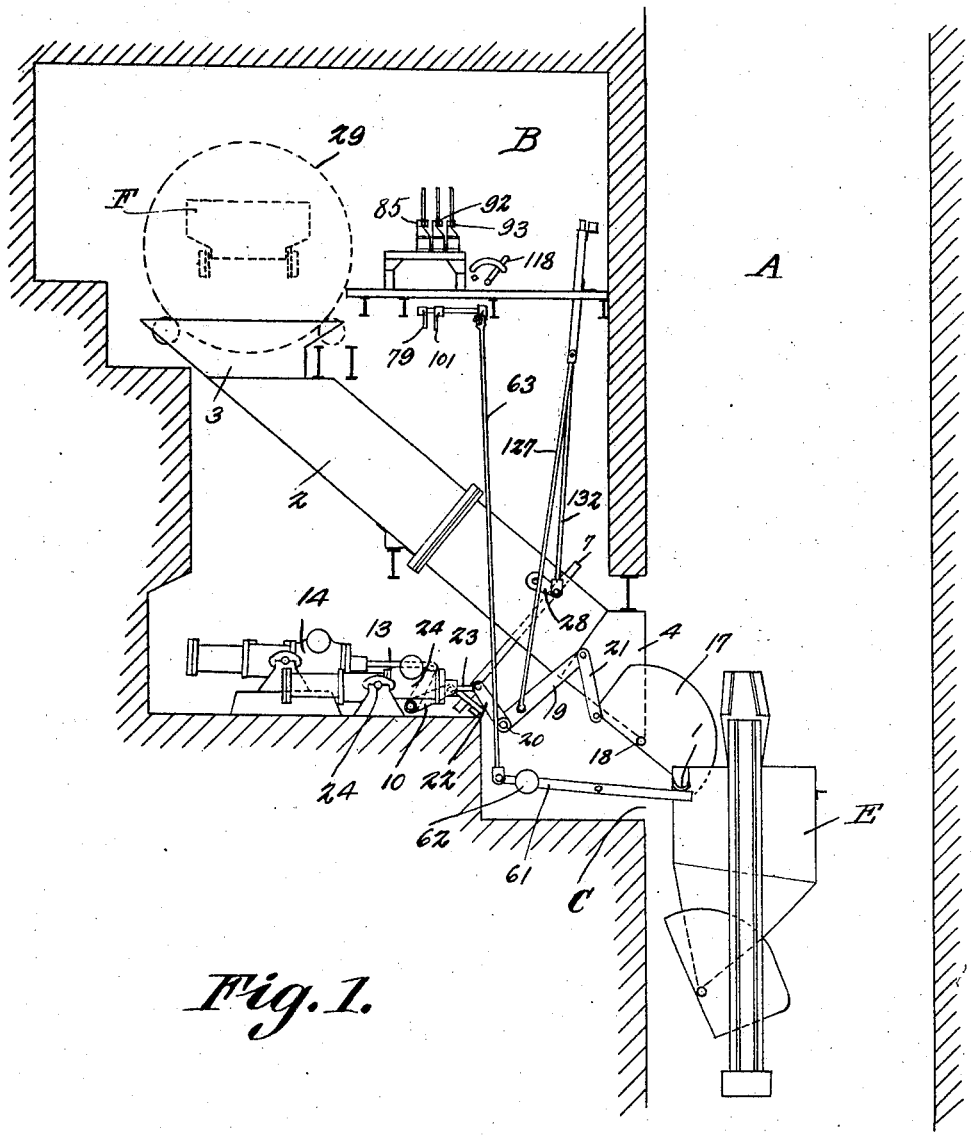
Figure 1 is a view showing more or less in diagram the relative arrangement of the parts of the loading mechanism.

Referring to the figures by characters of reference A designates a mine shaft and located within the mine is a loading chamber B which communicates with the shaft at C. A pair of balanced skips are adapted to travel within the shaft, these skips being indicated generally at D and E and being so supported that when one of them reaches the loading level the other skip reaches the delivering or discharge level. The construction of the skips is immaterial although it is preferred to utilize a skip such as shown for example, in Patent #1,304,784 issued to me on May 27, 1919. It might be stated, however, that each of these skips is provided in the present instance with a tripping device 1 located at any suitable point thereon for the purpose of operating certain of the mechanism when the skip reaches its loading level.

Loading mechanism.

Supported with the chamber B is a loading chute 2, this chute being inclined downwardly toward the outlet C and being provided, at its upper end, with a receiving hopper 3. The lower end of the chute is forked to provide separate outlet pockets 4 and 5 respectively so located as to deliver into the tops of the respective skips D and E when brought to loading position. A fly gate 6 is mounted to swing within the chute 2, its connection therewith being provided by a shaft 7 located at the angle formed by the diverging pockets. This shaft is provided with a crank arm 8 connected, by a link 9, to an arm 10 extending from a shaft 11. Another arm 12 is secured to this shaft 11 and is connected to the piston rod 13 of an air engine 14 or the like tiltably mounted at 15 upon a supporting base 16.

Thus it will be seen that when pressure is admitted to the engine to drive the piston rod 13 in one direction, the fly gate 6 will be thrust to one position so that, for example, the pocket 5 will be shut off from the chute 2 as illustrated in Fig. 13. When the piston rod 13 is propelled in the opposite direction, however, the fly gate will be swung about its axis of rotation to shut off the other pocket 4 from the chute 2.

Each pocket 4 and 5 has its discharge end disposed substantially in a vertical plane as shown particularly in Fig. 1 and under normal conditions the open ends of the pockets are closed by loading chutes 17 pivotally mounted at 18 and each adapted, when in one position, to extend upwardly across the open end of its pocket to prevent escape of material therefrom. When in delivering position each loading chute, as shown in Fig. 1, constitutes substantially an extension of the bottom of its pocket and overhangs the adjacent skip D or E so as to direct bulk material into the skip.

An arm 19 is extended from a shaft 20 adjacent each pocket and is connected by a link 21 to one end of the loading chute 17. Another arm 22 extends from the shaft 20 and is connected to the piston rod 23 by an engine 24 adapted to be operated by air or other fluid under pressure and it is preferably tiltably mounted as shown at 25. One of these engines 24 and the parts connected thereto is provided for each of the loading chutes 17.

Extending transversely within each of the pockets 4 and 5 is a shaft 26 to which is secured a blade 27 extending downwardly normally as shown in Fig. 12. A crank arm 28 extends from each shaft 26. Whenever a load is directed into one of the pockets the bulk material pushing against the depending blades 28, will swing the blade upwardly and cause the same to rest upon the material, thereby swinging the arm 28 upwardly. This will operate the signal mechanism as hereinafter explained.

Dump mechanism.

For the purpose of supplying bulk material to the chute 2 suitable dump mechanism may be used. It is preferred to employ a rotary dump indicated generally at 29, this dump being designed to receive a loaded car F which is fastened thereto in the usual or any preferred manner so that as the dump is rotated the contents of the car will be delivered into the hopper 3. The dump can be of the oscillatory type such for example, as disclosed in my Patent #1,456,388 issued to me on May 22, 1923, or it can be of the full rotary type.

In the structure illustrated, the dump 29 is provided with a projecting stop or abutment 30 adapted to bear against a latch 31 which is pivotally connected to one arm of a bell crank 32 shown particularly in Fig. 3. A spring 33 is mounted on a pin 34 pivotally connected to the bell crank and this spring is adapted to thrust against a collar 35 on the pin so as to support the latch 31 yieldingly in active position. The other arm of the bell crank 32 is connected by a rod 36, to an arm 37 extending from and rotatable on a shaft 38. Another arm 39 is secured to this arm 37 and has a rod 40 pivotally connected thereto and extending therefrom. The upper end of this rod is formed with a head 41 provided with a longitudinal slot 42 and projecting into the slot is a stud 43 projecting from the short arm of the valve lever 44 which is fulcrumed at 45. This lever is mounted upon the casing 46 of a three-way dump valve. The valve can be of any desired construction and it is not deemed necessary, therefore, to describe or illustrate it in detail.

Secured to the shaft 38 is an arm 47 connected by a rod 48 to the latch 31. Another arm 49 is extended laterally from and secured to the shaft 38 and carries a weight 50. A third arm 51 is secured to the shaft 38 and extends therefrom oppositely to the arm 39, this arm 51 being provided with a V-shaped head 52 forming an angle or apex 53.

The valve 46 is associated with an auxiliary valve 55 with which communicate pipe lines 56 and 57 designed to direct fluid under pressure to engines 58 and 59. The engine 58 constitutes a means for returning the dump 29 to normal position while the engine 59 constitutes a means for operating the dump 29. A main pressure supply pipe 60 communicates with the valve casings 46 and 55 and will be hereinafter explained.

*Interlocking mechanism.*

Pivotally mounted adjacent each of the pockets 4 and 5 is a lever 61, one of these levers being provided for each skip and one end of each lever being projected normally into the path of one of the tripping projections 1. The other end portion of each lever carries a weight 62 for swinging the lever with its free end normally raised so as to be contacted and depressed by a tripping projection 1 when a skip arrives at loading position. The weighted end of each lever 61 is connected by a rod 63 to a crank arm 64 secured to and extending radially from a rock shaft 65. As shown particularly in Fig. 5 the arms 64 on the two shafts 65 are extended toward each other. An arm 66 is extended downwardly from each shaft 65 and located midway between the two shafts is a hanger 67 in which is journaled a shaft 68. This shaft has diverging arms 69 rotatable on it and one of the arms is connected by a rod 70' to one of the arms 66 while the other arm 69 is connected by a rod 71 to the other arm 66. Thus when shaft 65 is rotated in one direction by the upward movement of rod 63, motion is transmitted to one arm 66 and 69 and through a rod 70' or 71.

Pivotally connected to the respective arms 66 are rods 72 and 73, rod 72 being provided with a flat head 74 which laps and is adapted to move relative to another head 75 carried by the rod 73. Each head has an arcuate slot 76, there being an upward extension at one end of one slot 76 as shown at 77, while another upward extension 78 is provided at the other end of the other slot 76. One arm of a bell crank 79 works between the two heads 74 and 75 and carries a transverse pin 80, the ends of which are movably seated in the respective slots 76. Thus it will be seen by referring to Fig. 5 that when one end of this pin 80 is seated, for example in the extension 77, thereby coupling rod 73 to the bell crank 79, the head 74 is uncoupled from the pin because the extension 78 is at a point remote from the pin.

The upper arm of the bell crank 79 is provided with a rod 81 which serves to connect said bell crank to an arm 82 projecting from a valve lever 83. A valve stem 84 is connected to the arm 82 and serves to operate a valve 85 which is in communication with a main supply pipe 86. This valve 85 controls the flow of pressure to the engine 14 which operates the fly gate 6. In other words when the valve lever 83 is shifted to one position, pressure will be directed through the valve from pipe 86 through a pipe 87 to the engine 14 and pressure will exhaust from said engine through a pipe 88. This operation of the engine will throw the fly gate 6 to one extreme position. By reversing the valve through the operation of lever 83, the circulation of pressure through the pipes 87 and 88 will be reversed so that the fly gate will thus be moved to its other extreme position. Any well known type of valve can be used for the purpose of reversing the flow of pressure and it is not deemed necessary to show or describe the same in detail.

A rod 89 is connected to the bell crank 70 and to one arm of a bell crank 90. The other arm of this bell crank as shown in Fig. 3, carries a roller 91 which normally bears against one of the inclined faces of the angle head 52. Thus when the rod 89 is thrust upwardly from the position shown in Fig. 3, the roller 91 will press against and depress the angle head 52 so as to cause shaft 38 to rotate against the action of weight 50 while at the same time arm 37 will thrust through rod 36 against bell crank 32. During this operation, arm 47 pulls through rod 48 and withdraws latch 31 from under stop 30. Spring 34 is thus released and expands upwardly, pushing the upper arm of the bell crank 32 upwardly. This pulls the rod 36 and arm 37 to the left in Fig. 3 and pushes arm 39 and rod 40 upwardly to unlock or release lever 44 (see Fig. 8). Lever 44 can therefore be actuated to work the dump. Immediately after the wheel 91 passes the apex 53, the weight 50 and the spring 33 will return the latch to its normal position where it will bring the dump to a stop when the same is returned to its point of starting. Thereafter should the rod 89 be pulled downwardly the roller 91 would be moved back to position shown in Fig. 3 but the same operation of the latch would take place as already described.

Mounted adjacent the fly gate valve 85 are valves 92 and 93 for controlling the operation of the chutes 17 that cooperate with the skips E and D respectively. In other words the chute 17 which cooperates with the skip E and which is controlled by valve 92 may be designated the "left" chute while the other chute 17 which cooperates with the skip D can be designated the "right" chute. The valve 92 has an operating handle 94 pivotally mounted at 95, as shown in Fig. 9 and provided with a radial arm 96 to which the valve stem 97 is connected. The arm 96 is pivotally and slidably engaged by the slotted end 98 of a rod 99 connected as at 100 to one arm of a bell crank 101. The other arm of this bell crank is connected by a rod 102 to an arm 103 secured to shaft 65, which controls the operation of the rod 73.

The valve 93 which controls the "right" chute has an operating lever or handle 104 pivotally mounted as at 105 and having an arm 106 to which is pivotally connected the valve stem 107. A rod 108 has a slotted end 109 pivotally and slidably engaging the arm 106 and this rod is pivotally connected at 110 to one arm of a bell crank 111. The other arm of this bell crank is connected by a rod 112 to an arm 113 secured to the other shaft 65 which controls the operation of the rod 72. It will be noted that valve 85 is adapted to receive fluid under pressure from pipe 60 through a branch pipe 114 and similar branch pipes 115 and 116 conducting pressure from pipe 60 to the valves 92 and 93. The flow of pressure to the pipe 60 can be controlled by a manually operated valve 117 having a handle 118.

Signal mechanism.

There is provided at a suitable point adjacent the valves a signal board 119 and another signal board 120 is located at a point remote therefrom, preferably where it can be seen by the hoist engineer. Each signal board contains a signal bell 121, an air line signal light 122, a chute signal light 123, a left chute light 124, and a right chute light 125. The two air line signal lights are electrically connected in series and this lighting circuit includes spaced contacts 126 located in the path of the valve handle 118. Thus when the valve 117 is shifted to open the air line the handle 118 will close the circuit through the contacts 126 and cause the lamps 122 to be illuminated. This will indicate at both signal boards that pressure is in the lines of the system and that the mechanism is therefore ready to operate.

Connected to the bell crank 19 of each chute 17 is a rod 127 to which is connected a plunger 128. Each plunger is located close to but spaced from normally engaging contacts 129 which thus complete a circuit to the bells 121 and the lamps 123. A push button or other form of switch 130 is located in this circuit so that by operating the same the bells will be sounded and the lights 123 will be flashed. Each of the plungers 128 has an insulating terminal 131. When the chutes 17 are closed these insulating portions are spaced from the contacts 129 as shown in Fig. 11, it being understood that the closing of the chute 17 will result in pulling downwardly on rods 127. Thus while both chutes are closed the operator at the loading stage can, by pressing the button, or switch 130, sound the bells 121 and flash the lights, thereby signalling the hoist engineer to start the skips. As long as either or both of the chutes 17 is open, one or both of the insulating portions 131 will be positioned between the adjacent contacts 129, thereby breaking the circuit to the bells 121 and lamps 123 and rendering it impossible for a starting signal to be given.

Each of the crank arms 28 has a rod 132 connected to it and these rods are provided at their upper ends with plungers 133. One plunger is normally spaced from contacts 134 electrically connected in series to the lamp 124 of the left hopper. The other plunger 133 cooperates with a pair of contacts 135 electrically connected in series to the lamps 125 of the right hopper. Thus when the pocket of either hopper is properly filled so that the blade 27 therein is lifted as before explained, the plunger 133 associated with said hopper will be shifted to close the circuit to the lamps associated with said hopper, thereby informing the engineer that the pocket is properly filled.

It is to be understood that the fly gate 6 is normally in one of two extreme positions and that both chutes 17 are normally closed. If the air pressure is in the pipe lines, that fact will be properly indicated by the lamps 122. If no coal has been dumped into the chute, neither of the lamps 124 or 125 will be lighted and the engineer will therefore know that it will be useless to bring a skip to loading position.

Operation.

It is to be understood that all of the levers of the control system are manually operated, except the one operating the fly gate. Also all levers except the dump operating lever, are locked against movement while the skips are in transit, and even this lever is locked as soon as the dump has been unloaded and returned to normal position.

When coal or other material is dumped into the chute 2 it will be deflected by the fly gate 6 into one of the pockets 4 or 5. As it enters this pocket the proper signal light 124 or 125 will be flashed. If the coal enters the right hand pocket 4 the engineer will know that the right skip is to be lowered so as to be loaded from the right pocket. As this skip reaches the lower limit of its movement the projection 1 thereon comes into contact with the lever 61 in the path thereof, thereby elevating its rod 63 so as to rotate the right shaft 65 in the direction indicated by the arrow in Fig. 5. The head 74 which is out of engagement with the pin 77 will thus be thrust along said pin until extension 78 is brought thereabove at which time said head will drop into engagement with the pin. Simultaneously with this action the arm 69 moves against the head 75 which is in engagement with pin 88 and lifts it so as to disengage it from the pin. Thus the parts are set to actuate the dump holding latch and the dump controlling valve at the proper time when the loaded cage starts on its upward trip.

At the same time rod 99 will be pulled downwardly. Thus lever 94 which controls the "left" chute 17 will be held against movement in the direction of the arrow in Fig. 10 and as rod 108 has been elevated to the position shown by dotted lines in Fig. 9 the valve handle controlling the right chute will be free to be swung normally in the direction indicated by the arrow in Fig. 9, thereby opening the valve and allowing air to flow from the pressure line 60 to the engine 24 that is connected to the arm 22 of the right chute mechanism. This actuation of the engine will result in the opening of the right chute and as the skip D has already arrived in loading position the chute will open thereinto so that the contents of the right pocket 5 will be delivered into the skip. As soon as this chute is opened the circuit to the bells 121 and lamps 123 is broken and a starting signal cannot be given. It becomes necessary, therefore, for the operator to close the valve 93 in order to close the chute and thereby enable the starting signal to be sounded.

As the loaded skip begins its ascent upon the sounding of the starter's signal and which, as before explained can only be sounded after both chutes 17 have been closed, the weighted lever 61 is released and pulls downwardly on the right hand rod 63 in Fig. 5. Thus the head 74 which has already dropped into engagement with pin 80 will be pulled to the right in Fig. 5 and cause bell crank lever 79 to thrust upwardly through rods 81 and 89. When the right hand shaft was first rotated by the right hand skip when brought to loading position and the links 99 and 108 moved to positions shown in Figs. 9 and 10 as heretofore described, it obviously becomes impossible to operate valve 92 because its handle or lever 94 was held against movement. Lever 104, could be operated to actuate the right hand valve for the purpose of closing chute 17 cooperating with the right trip D. Should the left trip E descend to loading position, the operation above described would be reversed, the left shaft 65 being actuated to slide head 75 to the right so that it will drop into engagement with the pin 80 while at the same time the left hand arm 69 will come against and raise head 74 so as to uncouple it from the pin. Thus when the left hand skip ascends the head 75 will pull on bell crank lever 79 and cause the rods 81 and 89 to pull downwardly.

From the foregoing it will be noted that an efficient interlocking arrangement is provided whereby it becomes impossible to open the wrong chute and only that chute can be opened which is associated with a skip that has been brought to the loading point. As before noted each time one of the rods 63 is thrust upwardly the rods 81 and 89 will be actuated. When rod 81 is thrust upwardly or pulled downwardly, it actuates valve lever 83 so as to shift valve 85 and direct pressure to one end of the engine 14. Thus the fly gate will be swung from one extreme position to the other. This will cut off communication between the open or delivering pocket and the chute 2 and will establish communication between said chute 2 and the closed pocket.

Simultaneously with this shifting of the fly gate, which takes place whether the valve handle 83 is moved to the right or to the left, the rod 89 thrusts against arm 90 and causes roller 91 to momentarily depress arm 51. Thus latch 33 is shifted to release the rotary dump and a new supply of material is delivered into the chute 2 and the pocket communicating therewith.

The spring 33 which has been held under restraint shifts the bell crank 32 so as to pull through rod 35 upon the arm 37, thereby causing arm 39, which is connected thereto, to swing on shaft 38 and thrust rod 40 upwardly. This releases lever 44 so that it can be swung back and forth to direct air under pressure from pipe 60 into either engine 59 or 58. Thus the operator can actuate the dump and can return it to normal position. When the dump is in car receiving position, it is not possible to operate lever 44 because the slotted head 41 will hold the lever against movement. It is sometimes advisable to operate the dump without depending upon releasing of the valve lever by the automatic mechanism. For this purpose the auxiliary valve 55 has been provided. This valve is adapted to be opened by a lever or handle 136. The auxiliary valve is so connected to the pipe line, that when it is operated pressure can be directed successively to the two engines independently of the operation of valve 46. In other words pressure is by-passed around valve 46 through valve 55. This auxiliary valve is only used when the dump requires actuation independently of the balance of the mechanism.

The pipe connections between the valves 46 and 55 are such that motive fluid passing through the system will first enter this auxiliary or emergency valve and then pass to the regular operating valve 46 while the exhaust from the regular operating valve will pass out through the emergency valve to the atmosphere. The handle or lever 136 of the auxiliary or emergency valve is weighted as shown at 137 so that said valve will be maintained normal in a predetermined position. When the emergency or auxiliary valve is in normal position, the rotary dump can be operated to and fro by the operator through the manipulation of the released valve lever 44 and until the dump is returned to normal position at which time lever 44 is locked against further movement as has heretofore been explained. By the use of the auxiliary or emergency valve, however, it is always free for manual operation, the rotary dump can still be moved back and forth should such action be necessary before the valve lever 44 is unlocked. The valve 46 may be of a standard type and the same is likewise true of the valve 55.

What is claimed is:—

1. In a hoist mechanism the combination with a chute having a pocket, and a loading chute normally closing the pocket, of power operated mechanism for release by an operator to move the loading chute to an open position, means for normally locking said mechanism against operation, a skip, and means operated by the skip when brought to loading position for unlocking said mechanism.

2. The combination with a bulk holding pocket and a loading chute normally closing the same, of power operated means for moving the chute to delivering position, a normally locked member for controlling said mechanism, a starter's signal, a skip, means operated by the skip when brought to loading position for unlocking said member, and means operated by the chute when brought to delivering position for rendering the starter's signal inoperative.

3. The combination with a bulk holding element and a loading chute normally closing the same, of power operated means for shifting the chute, a normally locked member for controlling said mechanism, means operated by a skip when brought to loading position for releasing said member, a starter's signal, and means operated by the chute when brought to delivering position for rendering the signal inoperative.

4. The combination with a bulk holding element, a delivery chute, a skip, and means for shifting the chute to direct material from said bulk holding element to the skip, of a starter's signal, and means operated by the chute when moved to delivering position for rendering the signal inoperative.

5. The combination with separate bulk receiving pockets, of delivering chutes normally closing the respective pockets, separate power operated means for actuating the respective chutes, a normally locked member for controlling the operation of each of said means, balanced skips movable alternately to loading positions, and means operated by each skip, when brought to loading position for releasing the controlling member of the loading chute and holding the member of the other chute against movement.

6. The combination with separate pockets for receiving bulk material and delivering chutes for closing the respective pockets, balanced skips movable to loading positions adjacent the respective pockets, separate power operated means for actuating the respective chutes, normally locked members for controlling the operation of said means, and means operated by each skip when brought to loading position for unlocking the member controlling the delivering of material to said skip.

7. The combination with separate bulk holding pockets and delivering chutes normally closing the pockets, of separate power operated means for actuating the respective chutes, normally locked members controlling the operation of the respective means, balanced skips movable to loading positions adjacent the respective pockets, means operated by each skip when brought to loading position for releasing the member controlling the loading of said skip, a starter's signal, and means operated by either or both chutes when out of closed position for rendering the signal inoperative.

8. The combination with separate bulk receiving pockets, of loading chutes normally closing the respective pockets, separate means for operating the respective chutes, balanced skips movable successively to loading positions, adjacent the respective pockets, a starter's signal, and means operated by either or both chutes when out of closed position for rendering the signal inoperative.

9. The combination with a chute and separate pockets communicating therewith, of a fly gate for diverting bulk material from the chute into either pocket, balanced skips movable successively to loading positions against the respective pockets, power operated means for moving the fly gate to either of two extreme positions, a reverse means for controlling said power operated means, and means operated by each skip when brought to loading position for shifting the reverse means to reverse the position of the fly gate.

10. The combination with a chute and separate pockets communicating therewith, of means for closing communication between said chute and either pocket, balanced skips movable alternately to loading positions adjacent the respective pockets, and means operated by the skips when brought to loading positions for opening communication between one of the pockets and the chute and closing communication between the other pocket and the chute.

11. The combination with a chute and a pocket communicating therewith, of means for closing communication between the chute and pocket, a loading chute normally closing the pocket, normally locked power operated means for actuating the chute, a skip movable to loading position adjacent the pocket, and means operated by the skip when brought to loading position for simultaneously releasing the chute operating means and for actuating the closure between the pocket and first named chute.

12. The combination with a pocket and a chute for delivering bulk material thereto, of a delivering chute normally closing the pocket, a signal device, and means operated by bulk material admitted to the pocket for actuating the signal device.

13. The combination with separate pocket signaling devices and a starter's signal, of separate pockets, means for delivering bulk material thereto, means operated by bulk material when admitted to the respective pockets for actuating the respective pocket signal devices, loading chutes normally closing the respective pockets, means for actuating the respective chutes, and means operated by either or both of the loading chutes for rendering the starter's signal inactive.

14. The combination with a chute, a pocket communicating therewith, and a loading chute normally closing the pocket, of a rotary dump for discharging into the first named chute, means for locking the dump against movement, a skip, power operated means for actuating the loading chute, and means operated by the skip when brought to loading position for actuating the loading chute to release the contents of the pocket, for unlocking the dump.

15. The combination with a pocket, a loading chute normally closing the same, a movable dump, and means for directing material from the dump to the pocket, of means for controlling the dump against movement, a power operated means for actuating the dump when released, a normally locked valve for controlling the power operated means, power operated means for actuating the loading chute, a normally locked valve for controlling said means, a skip, and means operated by the skip when brought to loading position for releasing the said valves to permit manual actuation thereof and for releasing the dump.

16. The combination with balanced skips, separate loading chutes therefor, a controlling member for each chute, and an operating element, for each valve member, of separate shafts, separate skip operated means for independently rotating the shafts in opposite directions respectively, links slidably and pivotally connected to the respective members, operating elements for holding them normally against movement, and means operated by either shaft for shifting a link to release one of the member operating members for actuation.

17. The combination with balanced skips, separate loading chutes therefor, a controlling member for each chute and an operating element for each member, of links slidably and pivotally connected to the respective member operating elements for normally holding them against movement, and means operated by each skip when brought to loading position, for shifting a link to release one of the member operating members for actuation.

18. The combination with balanced skips, separate loading chutes therefor, and a gate for controlling the flow of bulk material to the chute, of a controlling member for each chute and the gate, an operating element for each member, links slidably connected to the respective chute member operating elements to hold them against movement, means operated by each skip when brought to loading position for shifting a link to release one of the chute member operating elements for actuation, and means operated by the actuation of the shafts in either direction for operating the gate controlling member.

19. The combination with balanced skips, separate loading chutes therefor, a controlling member for each chute, and an operating element for each member, of a gate for controlling the flow of bulk material to the chutes, a member for controlling the operation of the gate, a lever for actuating said member, separate shafts, slotted means operatively connected to said shafts and lapping each other and the lever, means on the lever projecting into the slots, said slotted members being alternately movable by gravity into interlocked relation with said means, lifting devices connected to the respective shafts for disengaging the slotted means from operative engagement with the lever, during successive rotation of the shafts in opposite directions, links slidably and pivotally connected to the respective chute member operating means, and connections between said links and the respective shafts for shifting the links in opposite directions respectively when the shafts are rotated, thereby to release one of the chute member operating elements for actuation and to maintain the other chute member operating element against actuation.

20. In an apparatus of the class described, an interlocking mechanism including spaced controlling shafts, diverging lifting arms mounted for rotation, connections between said arms and the shafts, an operating lever, slotted heads lapping the lever, each slot provided with an extension, the extensions of the two slots being oppositely disposed, an operative connection between each head and one of the shafts, and means upon the lever projecting into both slots for successive engagement with the extensions of the slots, said lifting arms operating in timed relation for successively lifting the heads to disengage them from the lever.

21. The combination with spaced skip operated shafts and valve controlling means coupled to the respective shafts, of a dump engaging latch, a lever, means operated by the lever when moved in either direction for releasing the latch from the dump, lapping heads actuated by the respective shafts and having a slot provided with an extension, the extension and the two slots being positioned at opposite extremities respectively, means on the lever for engagement by the slotted portions of the heads and normally seated in one of the extensions, and separate means operated by the shafts for successively actuating either of the heads to engage the lever, and subsequently to lift the lever engaging head to disengage it from the lever, the other head being movable by gravity into engagement with said lever when the lever is brought to one limit of its movement.

22. The combination with spaced skip operated shafts and valve controlling means coupled to the respective shafts, of a dump engaging latch, a lever, a gate operating valve, a connection between said valve and the lever, means operated by the lever when moved in either direction for shifting the latch away from the dump, and for actuating the valve to operate its gate, lapping heads actuated by the respective shafts and having a slot provided with an extension, the extension and the two slots being positioned at opposite extremities respectively, means on the lever for engagement by the slotted portions of the heads and normally seated in one of the extensions, and separate means operated by the shafts for successively actuating either of the heads to engage the lever, and subsequently to lift the lever engaging head to disengage it from the lever, the other head being movable by gravity into engagement with said lever when the lever is brought to one limit of its movement.

23. The combination with spaced skip operated shafts and valve controlling means coupled to the respective shafts, of a dump engaging latch, a lever, means operated by the lever when moved in either direction for shifting the latch away from the dump, lapping heads actuated by the respective shafts and having a slot provided with an extension, the extension and the two slots being positioned at opposite extremities respectively, means on the lever for engagement by the slotted portions of the heads and normally seated in one of the extensions, and separate means operated by the shafts for successively actuating either of the heads to engage the lever, and subsequently to lift the lever engaging head to disengage it from the lever, the other head being movable by gravity into engagement with said lever when the lever is brought to one limit of its movement, a dump controlling valve, means for holding the valve normally against actuation, and means operated by the release of the latch for releasing the dump controlling valve.

24. In apparatus of the class described the combination with a dump, an engine for operating the dump, a valve for controlling the operation of the engine, and a latch normally restrained by the dump, of a chute having separate outlets, a fly gate for diverting material to either outlet, means for shifting the fly gate to either of two extreme positions, and means operated by the shifting of the fly gate for simultaneously shifting the latch out of dump engaging position and releasing the dump controlling valve.

25. In apparatus of the class described, the combination with a dump, an engine for operating the dump, a valve for controlling the operation of the engine, and a latch for engaging the dump, of a chute having separate outlets, a fly gate for diverting material to either outlet, means for shifting the fly gate to either of two extreme positions, means operated by the shifting of the fly gate for simultaneously shifting the latch out of dump engaging position and releasing the dump controlling valve, and a manually operated auxiliary valve for controlling the operation of the dump engine independently of the actuation of the first named dump valve.

26. The combination with a chute having separate outlets and a gate for diverting material to either outlet, of loading chutes normally closing the respective outlets, balanced skips movable successively to loading positions adjacent the respective chutes, separate members for controlling the operation of the delivery chutes, a member for controlling the operation of the gate, means operated by the arrival of either skip at loading position for reloading one of the loading chute members and coupling said means to the gate controlling member, and means operated by the removal of the skip from loading position for actuating the gate controlling member.

27. The combination with a starter's signal, of separate pockets, means for delivering bulk material thereto, loading chutes normally closing the respective pockets, means for actuating the respective chutes, and means operated by either or both of the loading chutes for rendering the starter's signal inactive.

28. The combination with balanced skips, separate loading chutes therefore, a controlling member for each chute and an operating element for each member, of means connected to the respective member operating element for normally holding them against movement, and means operated automatically upon the arrival of each skip at loading position, for shifting one of the holding means to release one of the member operating members for actuation.

29. The combination with spaced skip operated shafts and valve controlling means coupled to the respective shafts, of a dump restraining means, a lever, a gate operating valve, a connection between said valve and the lever, means operated by the lever when moved in either direction for releasing the dump from the restraining means, and for actuating the valve to operate its gate, lapping heads actuated by the respective shafts and each having a slot provided with an extension, the extension and the two slots being positioned at opposite extremities respectively, means on the lever for engagement by the slotted portions of the heads and normally seated in one of the extensions, and separate means operated by the shafts for successively actuating either of the heads to engage the lever, and subsequently to lift the lever engaging head to disengage it from the lever, the other head being movable by gravity into engagement with said lever when the lever is brought to one limit of its movement.

30. The combination with spaced skip operated shafts and valve controlling means coupled to the respective shafts, of a dump restraining means, a lever, means operated by the lever when moved in either direction for releasing the dump from its restraining means, lapping heads actuated by the respective shafts and each having a slot provided with an extension, the extension and the two slots being positioned at opposite extremities respectively, means on the lever for engagement by the slotted portions of the heads and normally seated in one of the extensions, and separate means operated by the shafts for successively actuating either of the heads to engage the lever, and subsequently to lift the lever engaging head to disengage it from the lever, the other head being movable by gravity into engagement with said lever when the lever is brought to one limit of its movement.

31. In apparatus of the class described, the combination with a dump, an engine for operating the dump, a valve for controlling the operation of the engine, and means for holding the dump against movement, of a chute having separate outlets, a fly gate for diverting material to either outlet, means for shifting the fly gate to either of two extreme positions, means operated by the shifting of the fly gate for simultaneously releasing the dump for movement and releasing the dump controlling valve, and a manually operated auxiliary valve for controlling the operation of the dump engine independently of the actuation of the first named dump valve.

32. In apparatus of the class described the combination with a dump, an engine for operating the dump, means for controlling the operation of the engine, and means normally restraining the dump, of a chute having separate outlets, a fly gate for diverting material to either outlet, means for shifting the fly gate to either of two extreme positions, and means operated simultaneously with the fly gate for shifting the restraining means out of dump restraining position and releasing the dump controlling means.

In testimony that I claim the foregoing as my own, I have hereto affixed my signature.

DANIEL F. LEPLEY.